(12) United States Patent
Hellholm et al.

(10) Patent No.: US 11,377,161 B2
(45) Date of Patent: Jul. 5, 2022

(54) TRACKED VEHICLE HAVING MOTOR COAXIALLY ARRANGED WITH DRIVE WHEEL

(71) Applicant: BAE Systems Hägglunds Aktiebolag, Örnsköldsvik (SE)

(72) Inventors: Björn Hellholm, Arnäsvall (SE); Jens Wågberg, Domsjö (SE); Daniel Engblom, Bonässund (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 307 days.

(21) Appl. No.: 16/616,899

(22) PCT Filed: May 17, 2018

(86) PCT No.: PCT/SE2018/050511
§ 371 (c)(1),
(2) Date: Nov. 25, 2019

(87) PCT Pub. No.: WO2018/222105
PCT Pub. Date: Dec. 6, 2018

(65) Prior Publication Data
US 2021/0147012 A1 May 20, 2021

(30) Foreign Application Priority Data
May 31, 2017 (SE) .................... 1750689-0

(51) Int. Cl.
*B62D 55/06* (2006.01)
*B60K 7/00* (2006.01)
(Continued)

(52) U.S. Cl.
CPC ............ *B62D 55/06* (2013.01); *B60K 7/0007* (2013.01); *B60K 7/0023* (2013.01); *B62D 55/10* (2013.01);
(Continued)

(58) Field of Classification Search
CPC ...... B62D 55/06; B62D 55/10; B62D 55/104; B62D 55/125; B60K 7/0007;
(Continued)

(56) References Cited

U.S. PATENT DOCUMENTS 3,510,174 A 5/1970 Lamb
4,291,779 A 9/1981 Mann et al.
(Continued)

FOREIGN PATENT DOCUMENTS

FR 2324812 A1 4/1977
JP 3016507 B2 3/2000
(Continued)

OTHER PUBLICATIONS

Russian Search Report received for RU Patent Application No. 2019143094, dated Mar. 31, 2021, 4 pages (English translation pp. 1-2, Original copy pp. 3-4).
(Continued)

*Primary Examiner* — Jacob D Knutson
*Assistant Examiner* — Abigail R Hymel
(74) *Attorney, Agent, or Firm* — Morrison and Foerster LLP

(57) ABSTRACT

The invention relates to a tracked vehicle comprising a vehicle body and a track assembly pair. Said track assembly pair is arranged to suspendedly support said vehicle body allowing relative movement between said vehicle body and each track assembly (21) of said track assembly pair. Each track assembly (21) comprises a track support beam (22) configured to support a plurality of road wheels (23, 23*a*), a drive wheel (24), and a motor (110) for operating said drive wheel (24), an endless track (25) being disposed around said road wheels (23, 23*a*) and drive wheel (24). Said motor (110) is fixedly arranged to said track support beam (22). Said motor (110) is arranged in connection to the drive
(Continued)

wheel (24) such that a motor axle essentially coaxially coincides with a centre axis (Z) of the drive wheel (24).

11 Claims, 4 Drawing Sheets

(51) Int. Cl.
    *B62D 55/10*     (2006.01)
    *B62D 55/104*     (2006.01)
    *B62D 55/125*     (2006.01)
    *B62D 55/14*     (2006.01)
    *B62D 55/24*     (2006.01)

(52) U.S. Cl.
    CPC ......... *B62D 55/104* (2013.01); *B62D 55/125* (2013.01); *B62D 55/14* (2013.01); *B62D 55/244* (2013.01); *B60K 2007/0038* (2013.01); *B60K 2007/0092* (2013.01)

(58) Field of Classification Search
    CPC .............................. B60K 7/0015; B60K 7/00; B60K 2007/0038; B60K 2007/0092; B60K 2007/0061
    See application file for complete search history.

(56) References Cited

U.S. PATENT DOCUMENTS

| | | | |
|---|---|---|---|
| 4,437,528 A | 3/1984 | Koehler et al. | |
| 6,260,465 B1 | 7/2001 | Zonak et al. | |
| 6,328,123 B1 | 12/2001 | Niemann et al. | |
| 6,358,176 B1 | 3/2002 | Nauheimer et al. | |
| 2003/0189377 A1* | 10/2003 | Wright | B62D 55/244 305/124 |
| 2007/0029878 A1* | 2/2007 | Gaudreault | B62D 55/0842 305/130 |
| 2007/0199749 A1* | 8/2007 | Rittenhouse | H02K 5/225 180/65.51 |
| 2009/0078528 A1 | 3/2009 | Uzawa et al. | |
| 2011/0162896 A1* | 7/2011 | Gillett | B60L 50/66 180/2.2 |
| 2013/0130574 A1* | 5/2013 | Tiew | B62D 55/00 440/5 |
| 2014/0219848 A1* | 8/2014 | Rabhi | F16C 33/585 418/24 |
| 2014/0300175 A1* | 10/2014 | Takahashi | G01L 5/0009 301/6.5 |
| 2014/0333120 A1* | 11/2014 | Pozzo | H02K 11/33 301/6.5 |
| 2017/0113742 A1 | 4/2017 | Tratta et al. | |
| 2019/0322166 A1* | 10/2019 | Yu | B60K 17/043 |

FOREIGN PATENT DOCUMENTS

| | | |
|---|---|---|
| RU | 2489295 C2 | 8/2013 |
| RU | 2539306 C2 | 1/2015 |
| WO | 2014/182216 A1 | 11/2014 |
| WO | WO-2014182235 A1 | 11/2014 |

OTHER PUBLICATIONS

Extended European Search Report received for European Application No. 18809825.5, dated Feb. 4, 2021, 10 pages.
International Search Report and Written Opinion received for PCT Patent Application No. PCT/SE2018/050511, dated Jul. 12, 2018, 13 pages.
Office Action received for Swedish Patent Application No. 1750689-0, dated Nov. 20, 2017, 9 pages (English Translation Only).

\* cited by examiner

TRACKED VEHICLE HAVING MOTOR COAXIALLY ARRANGED WITH DRIVE WHEEL

CROSS REFERENCE TO RELATED APPLICATIONS

This application is a national stage application under 35 U.S.C. § 371 of International Application No. PCT/SE2018/050511, filed internationally on May 17, 2018, which claims priority to SE 1750689-0, filed May 31, 2017.

TECHNICAL FIELD

The present invention relates to a tracked vehicle according to the preamble of claim 1.

BACKGROUND

Tracked vehicles normally comprise a pair of track assemblies, where each track assembly of the pair of track assemblies comprises a track support beam, a drive wheel, a plurality of road wheels and an endless track running over the drive wheel and said plurality of road wheels. Said drive wheel and said plurality of road wheels are rotatably secured to said track support beam. Said drive wheel is arranged to drive said endless track running over said drive wheel and said set of road wheels so as to propel the tracked vehicle. Such a tracked vehicle comprises a drive unit comprising said track assemblies and drive means for driving said drive wheels of the tracked vehicle, where said drive means may comprise any suitable engine/motor.

WO2014182216A1 discloses a tracked vehicle having a track assembly comprising a track support beam configured to support a plurality of road wheels and a drive wheel. Said track support beam is supported by a vehicle chassis of the tracked vehicle by means of a suspension device allowing relative movement between the track support beam and the vehicle chassis. The tracked vehicle comprises a drive unit comprising said track support beam an electric motor which is connected to said at least one drive wheel and integrated in said track support beam in a longitudinal direction of said track support beam, said electric motor being be fixedly arranged to said track support beam. Hereby driving of the respective drive wheel of the vehicle is facilitated. Although a relatively compact drive unit with low weight may be obtained, the electric motor still occupies space for other relevant components such as bushings and fastening arrangements for road wheel arms and spring arrangements.

Consequently there is a need to present improvements for track assemblies for tracked vehicles.

OBJECTS OF THE INVENTION

An object of the present invention is to provide a tracked vehicle with a track assembly pair for driving the vehicle which facilitates high operational reliability and efficiency in which motor for said operation provides a compact solution.

SUMMARY OF THE INVENTION

These and other objects, apparent from the following description, are achieved by a tracked vehicle which is of the type stated by way of introduction and which in addition exhibits the features recited in the characterising clause of the appended claim 1. Preferred embodiments of the tracked vehicle are defined in appended dependent claims.

Specifically an object of the invention is achieved by a tracked vehicle comprising a vehicle body and a track assembly pair, said track assembly pair being arranged to suspendedly support said vehicle body allowing relative movement between said vehicle body and each track assembly of said track assembly pair, each track assembly comprising a track support beam configured to support a plurality of road wheels, a drive wheel, and a motor for operating said drive wheel, an endless track being disposed around said road wheels and drive wheel, said motor being fixedly arranged to said track support beam, characterized in that said motor is arranged in connection to the drive wheel such that a motor axle essentially coaxially coincides with the centre axis of the drive wheel.

By thus arranging said motor in connection to the drive wheel such that a motor axle essentially coaxially coincides with the centre axis of the drive wheel and where relative movement between said vehicle body and each track assembly of said track assembly pair by means of suspendedly supporting said vehicle body via e.g. a suspension arrangement is allowed, high operational reliability and efficiency of said tracked vehicle is facilitated in which motor for said operation provides a compact solution.

By thus arranging said motor in connection to the drive wheel such that a motor axle essentially coaxially coincides with the centre axis of the drive wheel a compact solution for said motor arranged in said track assemblies is facilitated, wherein space is made available e.g. in connection to said track support beam for suspension arrangements.

The tracked vehicle may comprise one or more tracked vehicle units. The tracked vehicle comprises according to an embodiment more than one tracked vehicle unit, said vehicle units being articulately connected to each other. The tracked vehicle is according to an embodiment a tracked articulated vehicle.

The tracked vehicle thus comprises opposite track assemblies, a right track assembly and the opposite track assembly constituting a left track assembly, said right and left track assemblies constituting said track assembly pair. For a tracked vehicle comprising more than one vehicle unit, each vehicle unit comprises such a track assembly pair.

Each track support beam is further arranged to support a tension wheel.

According to an embodiment of the tracked vehicle said motor is arranged in connection to the drive wheel so that the motor at least partly is accommodated within the periphery of the drive wheel in the direction transversal to a main direction of extension of the track assembly so as to allow said motor to move relative to said vehicle body together with said track assembly. Hereby a compact arrangement of the motor of the track assembly is provided making space available in the track assembly in connection to said track support beam.

Said motor is arranged in connection to the drive wheel inside an internal space of said drive wheel or next to said drive wheel so that the motor at least partly is accommodated within the periphery of the drive wheel in the direction transversal to a main direction of extension of the track assembly so as to allow said motor to move relative to said vehicle body together with said track assembly. The drive wheel has an opening into said internal space of said drive wheel for receiving said motor. Said internal space has a ring-shaped cross section. Said internal space of the drive wheel has a transversal extension relative to the main direction of extension of the track assembly. The motor is according to an embodiment arranged to at least partly extend through said opening of said internal space of said drive wheel.

According to an embodiment of the tracked vehicle the motor in the direction essentially perpendicular to the longitudinal direction and the transversal direction of the endless track is arranged within the periphery of the endless track. Hereby the motor is efficiently protected within the track assembly.

According to an embodiment of the tracked vehicle the motor is accommodated within said drive wheel within the outer contours of the drive wheel. Hereby the motor is efficiently protected by the drive wheel.

According to an embodiment of the tracked vehicle said motor is comprised in a drive arrangement, said drive arrangement further comprising a transmission device for transferring torque from said motor to said drive wheel and a brake member for braking the drive wheel, wherein at least one of said transmission device and said brake member is arranged in connection to the drive wheel so that it at least partly is accommodated within the periphery of the drive wheel in the direction transversal to a main direction of extension of the track assembly. By thus providing a drive arrangement and also arranging e.g. said transmission device in connection to the drive wheel so that it at least partly is accommodated within the periphery of the drive wheel a compact solution for said drive arrangement arranged in said track assemblies is facilitated, wherein space is made available e.g. in connection to said track support beam for suspension arrangements.

The transmission device may be any suitable transmission device for transferring torque from said motor to said drive wheel. The transmission device comprises according to an embodiment a planetary gear and a transmission axle with an input axle configured to be coupled to said motor axle and an output axle configured to be coupled to said drive wheel for torque transfer to said drive wheel.

According to an embodiment of the tracked vehicle said motor is an electric motor or a hydraulic motor, said motor comprising a stator and a rotor for providing a rotational movement of said motor axle relative to the stator for said operation of the drive wheel.

According to an embodiment of the tracked vehicle the stator of the motor is fixedly arranged relative to said track support beam via a fastening arrangement and the rotor of the motor is arranged to drive said drive wheel. Hereby efficient operation of said tracked vehicle is obtained.

The rotor of the motor is thus arranged to drive said drive wheel via said transmission device. The motor is according to an embodiment configured to be in a motor housing wherein said stator is fixedly arranged in said motor housing.

According to an embodiment said drive arrangement comprises a bearing configuration arranged to allow the drive wheel to rotate relative to the stator of the motor. The bearing configuration comprises according to an embodiment a rolling bearing.

According to an embodiment of the tracked vehicle said fastening arrangement comprises a fork configuration for supporting said drive wheel and said motor, said drive wheel being rotatably coupled to said rotor. By thus providing a fastening arrangement with a fork configuration efficient support of drive wheel and fixation of stator of motor is facilitated, thus facilitating a compact arrangement for the motor and hence also the drive arrangement so that space is made available in the track assembly. The fork configuration may also be denoted claw configuration. The fork configuration may have any suitable shape for supporting non rotating parts of said drive arrangement. The fork configuration may have supporting arms or claws having a supporting function and facilitating attachment of non-rotating parts of said drive arrangement.

Said fork configuration is thus arranged to support said drive arrangement. Said stator of the motor is arranged to be fixedly attached to said fork configuration. Said stator of the motor is according to an embodiment arranged to be fixedly attached to said fork configuration via said motor housing. Non rotating parts of said drive arrangement are arranged to be fixedly attached to said fork configuration.

Said fork configuration of said fastening arrangement is according to an embodiment an integrated part of said track support beam. Said fork configuration may be attached to said track support beam by means of any suitable attachment means such as e.g. by a welding joint. Said fork configuration is arranged at an end portion of said track support beam for supporting said drive wheel and hence drive arrangement and motor.

Said fork configuration comprises a right claw member and a left claw member. Said fork configuration comprises a transversal portion from which said right claw member and a left claw member are arranged to project.

According to an embodiment of the tracked vehicle said fastening arrangement comprises clamping members for clamping said stator to said fork configuration. By thus providing clamping members the motor will be efficiently fixed to said track support beam via said fork configuration and still allowing access to the motor and thus drive arrangement by removal of said clamping members.

Said clamping members are thus configured to be removably attached to said fork configuration for lamping said stator to said fork configuration.

According to an embodiment of the tracked vehicle said tracked vehicle is a forestry machine, such as a forwarder.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIG. 4 schematically illustrates a partly exploded perspective view of the track assembly in FIG. 3a;

DETAILED DESCRIPTION

Hereinafter the term "track support beam" refers to a structural element arranged to support ground-engaging means such as e.g. an endless track as well as drive wheel and road wheels.

Herein the term "skid beam" refers to an example of a track support beam.

Hereinafter the term "track assembly" refers to a unit of the tracked vehicle comprising track support beam, drive wheel and road wheels as well as a circumferential endless track, which unit is arranged to comprise ground-engaging means and configured to propel the vehicle and thus form at least part of a drive unit of the tracked vehicle.

Hereinafter the term "track assembly pair" refers to opposite track assemblies of a vehicle unit of the vehicle, one track assembly constituting a right track assembly and the opposite track assembly constituting a left track assembly.

Hereinafter the term "articulated vehicle" refers to a vehicle with at least a front and a rear vehicle unit which are pivotable relative to each other about at least one joint.

Hereinafter the term "vehicle body" refers to any structure of a vehicle configured to support track assemblies of a tracked vehicle and may comprise or constitute the vehicle chassis. The term "vehicle body" may refer to a vehicle frame, one or more beams or the like.

Hereinafter the term "fork configuration" refers to any suitable fork-like or claw like configuration for supporting non-rotating parts of a drive arrangement comprising a motor, and may have supporting arms or claws having a supporting function and facilitating attachment of non-rotating parts of said drive arrangement.

Figure 1:
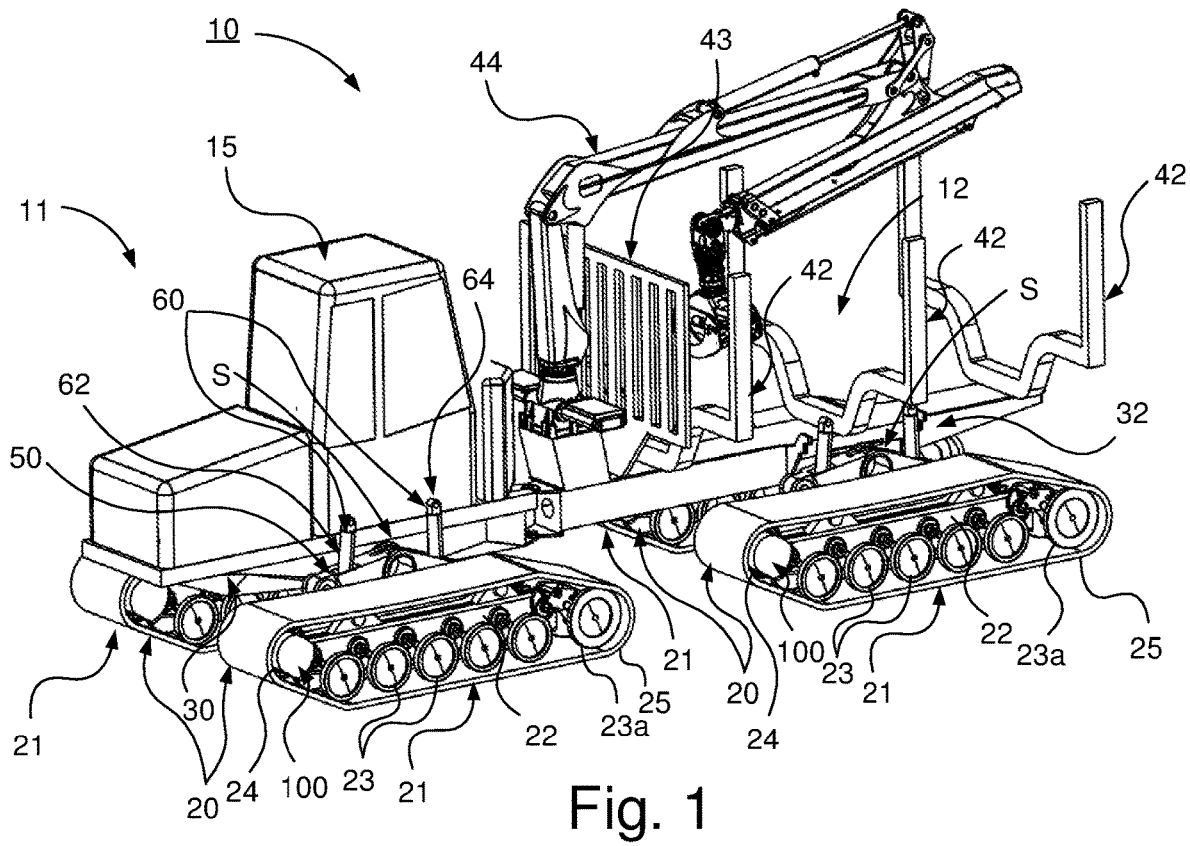
FIG. 1 schematically illustrates a perspective view of a tracked vehicle comprising drive unit pairs according to an embodiment of the present invention.

Referring to FIG. 1, a tracked vehicle 10 according to the present invention is illustrated, provided with a front vehicle unit 11 and a rear vehicle unit 12.

Each of the front and rear vehicle unit comprises a track assembly pair 20. Said track assembly pair 20 is constituted by or comprised of a drive unit pair. Said track assembly pair 20 comprises two track assemblies 21 arranged on opposite sides of the vehicle 10. The respective track assembly 21 is constituted by or comprised of a drive unit. The respective track assembly 21 is constituted by a driving track assembly and is arranged for propulsion of the vehicle. The respective track assembly pair 20 is connected to an intermediate vehicle body 30, 32, such as a chassis beam. Thus, the front vehicle unit 11 comprises a vehicle body 30 and the rear vehicle unit 12 comprises a vehicle body 32.

Each of the front and rear vehicle unit 11, 12 comprises a suspension device S for the respective track assembly 21. The respective track assembly 21 of the respective vehicle unit 11, 12 is thus arranged to be supported by the respective vehicle body 30, 32 by means of said suspension device S. Said track assembly pair 20 is thus arranged to suspendedly support said vehicle body 30, 32 allowing relative movement between said vehicle body 30, 32 and each track assembly 21 of said track assembly pair 20. Said track assembly pair 20 is thus arranged to suspendedly support said vehicle body 30, 32 by means of said suspension device.

The suspension device S of the respective vehicle unit 11, 12 for each track assembly 21 may comprise any suitable arrangement for allowing relative movement between said vehicle body 30, 32 and each track assembly 21 of said track assembly pair 20.

The suspension device S according to the example in FIG. 1 comprises a bogie arrangement 50. The bogie arrangement 50 is configured to be rotatably attached to the vehicle body 30, 32 of the respective vehicle unit 11, 12 of the tracked vehicle 11, about an axis of rotation transversal to the longitudinal extension of said track assembly 21 and attached to said track support beam 22 in connection to two fastening points so that the track support beam 22 is allowed to rotate in a rotational plane extending along the longitudinal extension of said track support beam 22 about said axis of rotation. Said bogie arrangement is rotatably attached to said vehicle body at a single fastening point for said axis of rotation. The respective bogie arrangement 50 comprises bogie arms pivotably connected to each other and rotatably attached to a respective fastening point of said two fastening points of said track support beam 22 so that said bogie arms are allowed to move relative to each other in said rotational plane. Said bogie arrangement 50 is thus an articulated bogie arrangement.

The suspension device S according to the example in FIG. 1 comprises or constitutes a track assembly suspension configuration.

Said suspension device S further comprises a suspension configuration 60 which according to this embodiment is constituted by a gas hydraulic suspension configuration 60. The gas hydraulic suspension configuration 60 is arranged for damping the movement of said bogie arrangement 50 and hence the movement of the track assembly 21 relative to the vehicle body 30, 32.

The gas hydraulic suspension configuration 60 is further arranged for controlling the position of the bogie arrangement 50 and hence the position of the track assembly 21 relative to the vehicle body 30, 32.

Said gas hydraulic suspension configuration 60 comprises according to this embodiment a pair of hydraulic cylinders 62, 64 for the respective track assembly 21 of the tracked vehicle 10.

Each track assembly 21 comprises a track support beam 22, a set of road wheels 23, 23a, a drive wheel 24, and an endless track 25. Said endless track 25 is arranged to run over the drive wheel 24 and said set of road wheels 23, 23a.

Each track assembly 21 comprises a drive arrangement 100 comprising a motor for operating said drive wheel 24. Said drive arrangement 100 further comprises a transmission device for transferring torque from said motor to said drive wheel 24 and a brake member for braking the drive wheel. According to an embodiment said drive wheel 24 is also comprised in said drive arrangement 100. Said drive arrangement 100 is described in more detail with reference to FIGS. 3a-b, 4 and 5.

The drive arrangement 100 is arranged in connection to the drive wheel so that it at least partly is accommodated within the periphery of the drive wheel in the direction transversal to a main direction of extension of the track assembly. At least one of said motor, transmission device and said brake member of the drive arrangement 100 is arranged in connection to the drive wheel so that it at least partly is accommodated within the periphery of the drive wheel in the direction transversal to a main direction of extension of the track assembly.

Figure 5:
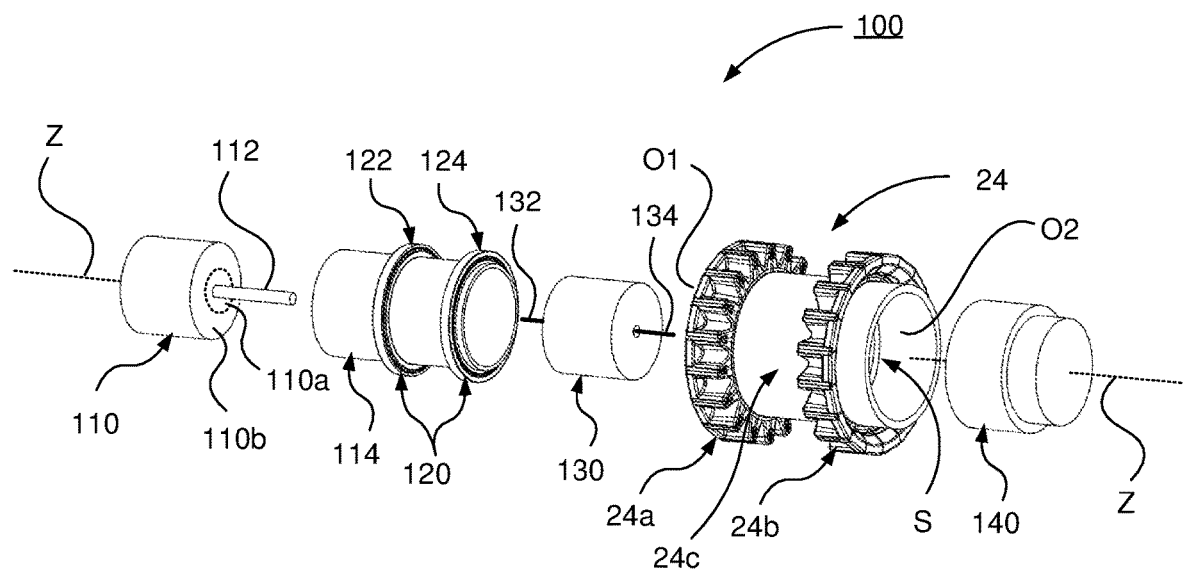
FIG. 5 schematically illustrates an exploded perspective view of a drive arrangement comprising a motor according to an embodiment of the present invention.

The drive arrangement 100 is arranged in connection to the drive wheel 24 such that a motor axle essentially coaxially coincides with the centre axis of the drive wheel 24, which is illustrated in e.g. FIG. 5.

Said vehicle body 30, 32 of the respective vehicle unit 11, 12 is arranged to support a vehicle structure, e.g. in the form of a vehicle cabin, power supplies, load carrying structure and a crane.

According to this configuration of the vehicle 10, the vehicle body 30 of the front vehicle unit 11 is arranged to support a vehicle cabin 15 and a power supply, such as an internal combustion engine, where the internal combustion engine according to one embodiment is constituted by a diesel engine.

According to this configuration of the vehicle 10, the vehicle body 32 of the rear vehicle unit 12 is arranged to support a U-beam configuration 42 or a load beam configuration 42 for supporting timber and a loading gate 43. The vehicle body 32 of the rear vehicle unit 12 is according to this embodiment also arranged to support a crane 44 for loading/unloading of timber.

The exemplified vehicle 10 is a tracked forestry vehicle in the form of a forwarder intended to transport timber from a harvesting site to a collection site. The vehicle 10 according to the present invention may be constituted by any suitable tracked vehicles. According to one embodiment, the vehicle 10 is a harvester intended for cutting timber.

The exemplified vehicle 10 may according to an embodiment be a diesel-electric driven vehicle comprising said drive arrangement 100. The vehicle 10 may according to one alternative have any suitable power supply involving said drive arrangement 100 for the propulsion of the vehicle 10. The vehicle 10 is according to one alternative a hybrid-powered vehicle involving said drive arrangement 100. The vehicle 10 is according to one alternative electrically driven involving said drive arrangement 100, where power according to one alternative is supplied by means of an energy storage device such as a battery unit, fuel cell or capacitor unit.

Figure 2:
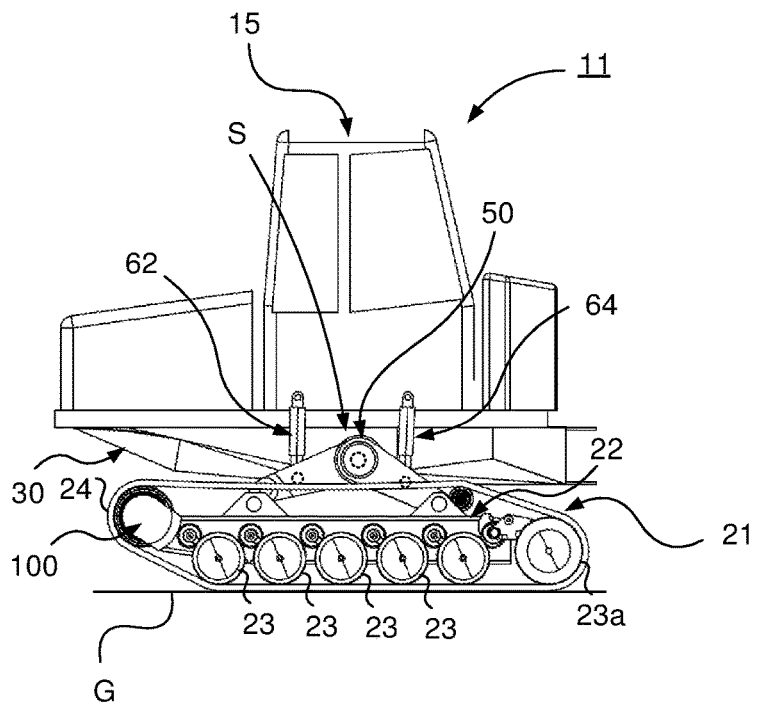
FIG. 2 schematically illustrates a side view of a tracked vehicle according to an embodiment of the present invention.

FIG. 2 schematically illustrates a side view of a tracked vehicle 11 according to an embodiment of the present invention. The tracked vehicle 11 essentially corresponds to the vehicle unit 11 in FIG. 1. FIG. 2 schematically illustrates a side view of the tracked vehicle 11 with a suspension device S where the vehicle body 30 is raised relative to the track assembly 21 and hence the drive arrangement 100 with the motor. Said track assembly 21 engages with the ground G. Said gas hydraulic suspension configuration is controlled such that front and rear hydraulic cylinders 62, 64 are expanded so that the vehicle body 30 is raised relative to the track assembly, said bogie arm configuration 50 allowing said raising of the vehicle body 30.

Figure 3A:
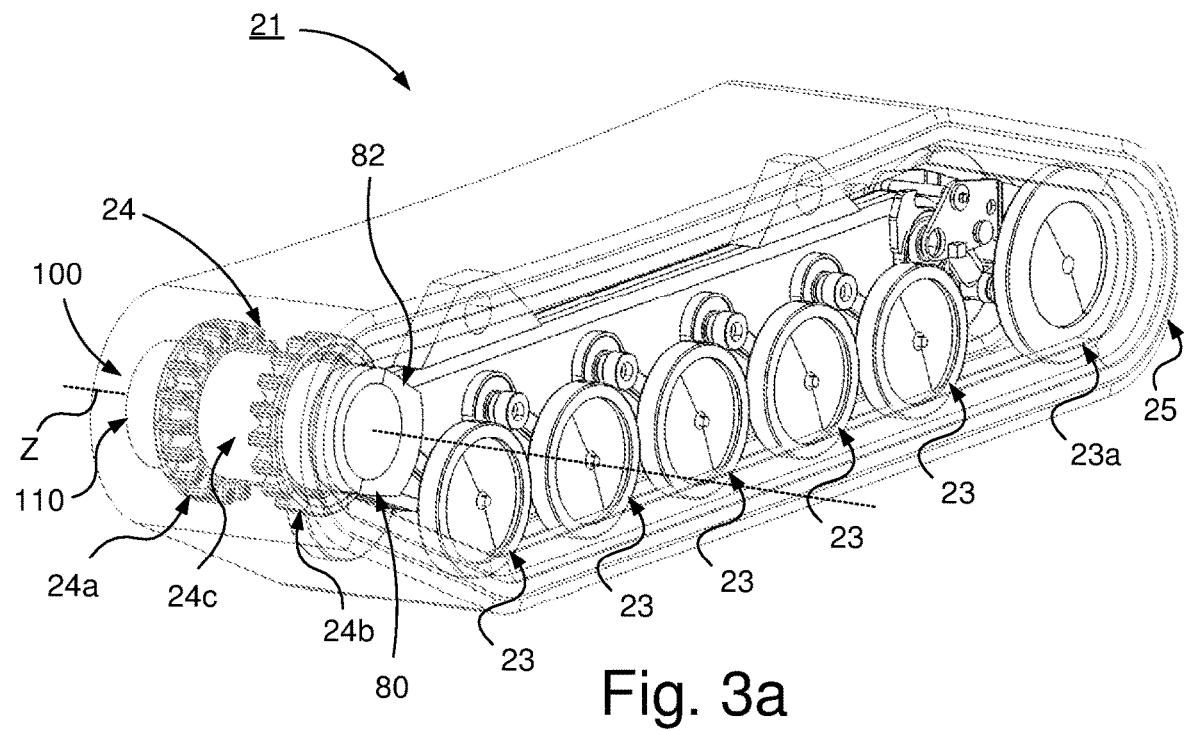
FIG. 3a schematically illustrates a perspective view of a track assembly comprising a drive arrangement according to an embodiment of the present invention.
Figure 3B:
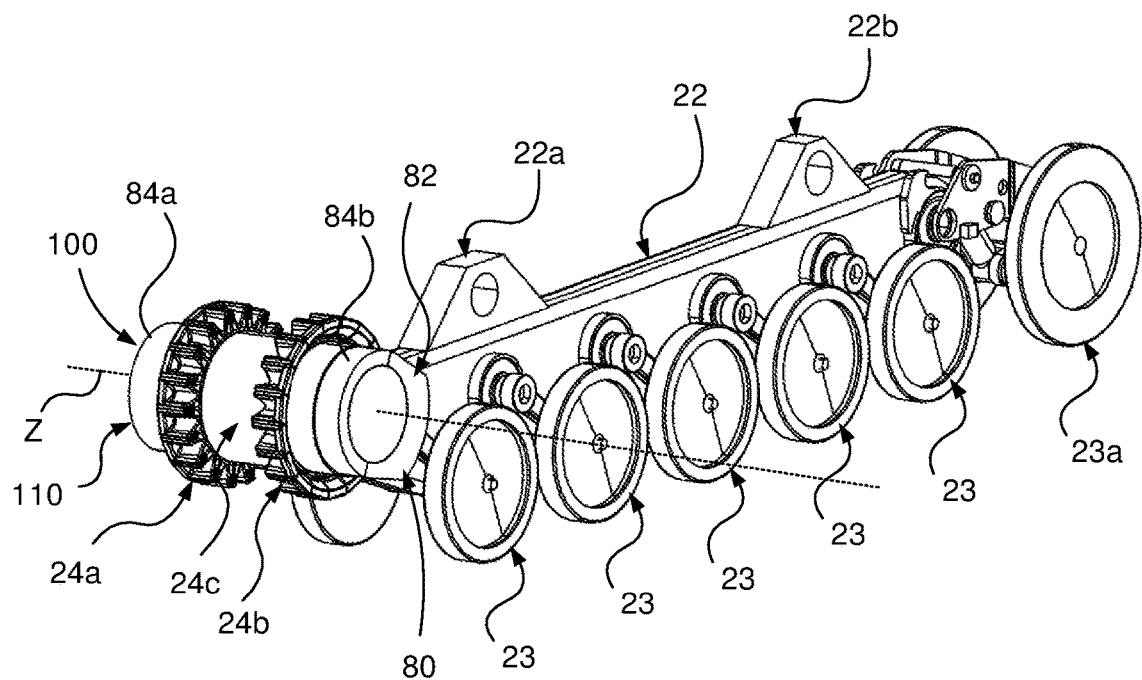
FIG. 3b schematically illustrates a perspective view of the track assembly in FIG. 3a without the endless track.
Figure 4:
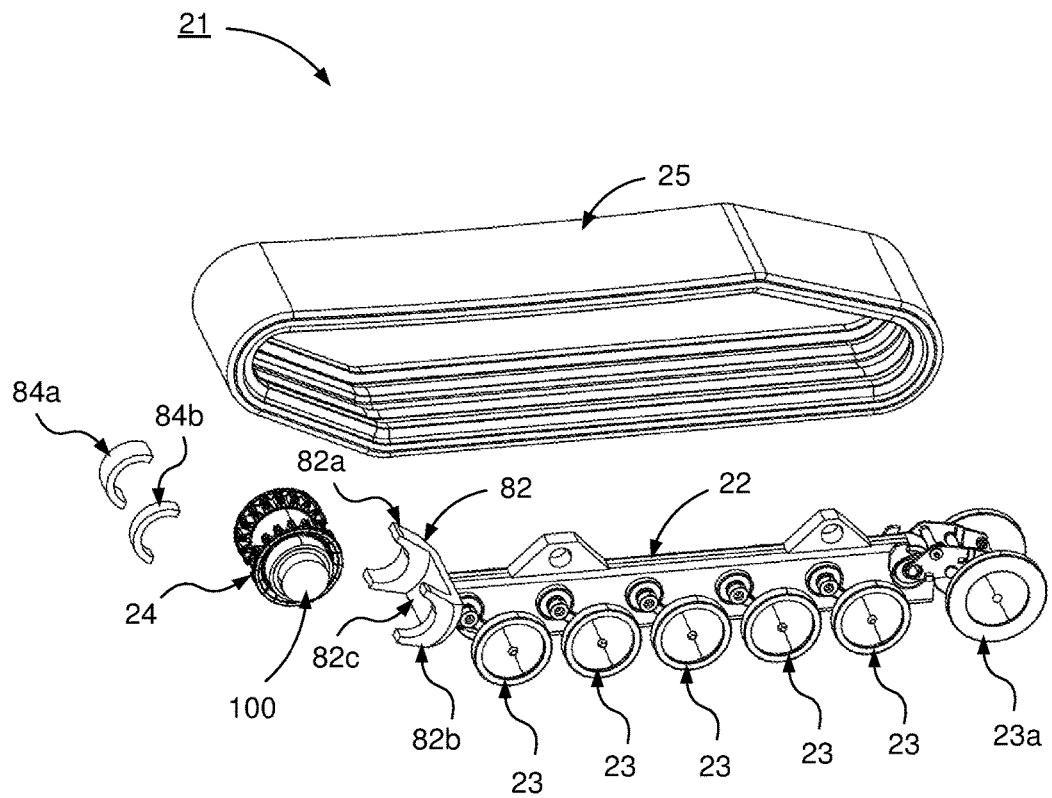

FIG. 3a schematically illustrates a perspective view of a track assembly 21 comprising a drive arrangement according to an embodiment of the present invention, FIG. 3b schematically illustrates a perspective view of the track assembly in FIG. 3a without the endless track 25, and FIG. 4 schematically illustrates a partly exploded perspective view of the track assembly 21 in FIG. 3a.

The track assembly 21 is together with another track assembly forming a track assembly pair as described with reference to FIGS. 1 and 2 arranged to drive a tracked vehicle/tracked vehicle unit.

The track assembly 21 comprises a track support beam 22, which is here constituted by a skid beam. The track assembly further comprises a set of road wheels 23, 23a, a drive wheel 24, and an endless track 25. Said endless track 25 is arranged to run over the drive wheel 24 and said set of road wheels 23, 23a. The track assembly 21 has one drive wheel but may have more than one drive wheel.

Said set of road wheels 23, 23a and the drive wheel 24 are arranged to be rotatably supported by said track support beam 22 in a suitable manner. Said set of road wheels 23, 23a are arranged in a pair configuration, meaning that the respective road wheels 23, 23a in each pair configuration is arranged on opposite sides of said track support beam 22. The support wheel 23a arranged at the very rear of the track support beam 22 also has a track tension wheel function and is constituted by a tension wheel.

The track support beam 22 comprises a front element 22a comprising a front fastening point and a rear element 22b comprising a rear fastening point, said elements 22a, 22b being arranged to receive suspension means such as e.g. a bogie arrangement in accordance with FIGS. 1 and 2, pendulum arms or other suitable arrangement for suspension for allowing relative movement of tracks assembly relative to vehicle body. Said front element 22a and rear element 22b constitute integrated parts of said track support beam 22 arranged between two longitudinal beams of the track support beam 22 and arranged to project from an upper portion of said longitudinal beams within the circumference of the endless track surrounding the track support beam 22.

The drive wheel 24 comprises a first gear portion 24a and a second gear portion 24b, said gear portions 24a, 24b being arranged to engage with said endless track 25 for rotating said endless track 25 for propulsion of the tracked vehicle.

The drive wheel 24 comprises a housing portion 24c. The first gear portion 24a and second gear portion 24b are arranged to surround said housing portion 24c. The first gear portion 24a and second gear portion 24b are protrudingly arranged about said housing portion 24c. The first gear portion 24a and second gear portion 24b are coaxially aligned and laterally separated from each other.

The track assembly 21 comprises a drive arrangement 100. The drive arrangement 100 comprises a motor for operating said drive wheel 24. The drive arrangement 100 further comprises a transmission device for transferring torque from said motor to said drive wheel 24 and a brake member for braking the drive wheel. According to an embodiment said drive wheel 24 with said drive arrangement 100 constitutes a drive unit. The drive wheel 24 with said drive arrangement 100 comprising said motor thus constitutes a motorised drive wheel for operating a tracked vehicle. Said drive arrangement 100 is described in more detail with reference to FIG. 5.

The drive arrangement 100 is arranged in connection to the drive wheel 24 so that it at least partly is accommodated within the periphery of the drive wheel 24 in the direction transversal to a main direction of extension of the track assembly. At least one of said motor, transmission device and said brake member of the drive arrangement 100 is arranged in connection to the drive wheel so that it at least partly is accommodated within the periphery of the drive wheel in the direction transversal to a main direction of extension of the track assembly. As described in more detail with reference to FIG. 5 the housing portion 24c of said drive wheel 24 is arranged to receive said drive arrangement 100 so that it at least partly is accommodated within the housing portion 24c of the drive wheel 24.

The drive arrangement 100 is arranged in connection to the drive wheel 24 such that a motor axle essentially coaxially coincides with the centre axis Z of the drive wheel 24, which is illustrated in e.g. FIG. 5.

The track assembly 21 comprises a fastening arrangement 80 arranged relative to said track support beam 22. The fastening arrangement 80 is arranged to support said drive arrangement 100.

As shown e.g. in FIG. 4 the fastening arrangement 80 comprises according to this embodiment a fork configuration 82 for supporting said drive wheel 24 and drive arrangement 100.

Non rotating parts of said drive arrangement 100 are arranged to be fixedly attached to said fork configuration 82. The fork configuration 82 may also be denoted claw configuration. The fork configuration 82 may have any suitable shape for supporting non rotating parts of said drive arrangement 100. The fork configuration may have supporting arms or claws having a supporting function and facilitating attachment of non-rotating parts of said drive arrangement 100.

Said fork configuration 82 of said fastening arrangement 80 is according to this embodiment an integrated part of said track support beam 22. Said fork configuration 82 is arranged at an end portion of said track support beam 22 for supporting said drive wheel 24 and hence drive arrangement 100.

Said fork configuration 82 comprises according to this embodiment a right claw member 82a and a left claw member 82b. Said fork configuration 82 comprises a transversal portion 82c from which said right claw member 82a and a left claw member 82b are arranged to project.

Said fastening arrangement 80 comprises according to this embodiment clamping members 84a, 84b for clamping said drive arrangement 100 to said fork configuration 82. Said fastening arrangement 80 comprises a right clamping member 84a and a left clamping member 84b. Said right clamping member 84a is arranged to clamp said drive arrangement 100 to said right claw member 82a of said fork configuration 82 in connection to the right side of said drive wheel 24 and said left clamping member 84b is arranged to clamp said drive arrangement 100 to said left claw member 82b of said fork configuration 82 in connection to the left side of said drive wheel 24.

As can be seen in FIG. 3a the drive arrangement 100 is, in the direction essentially perpendicular to the longitudinal direction and the transversal direction of the endless track 25, arranged within the periphery of the endless track 25. The transversal extension of the drive arrangement 100 is within the width of the endless track 25.

Figure 6:
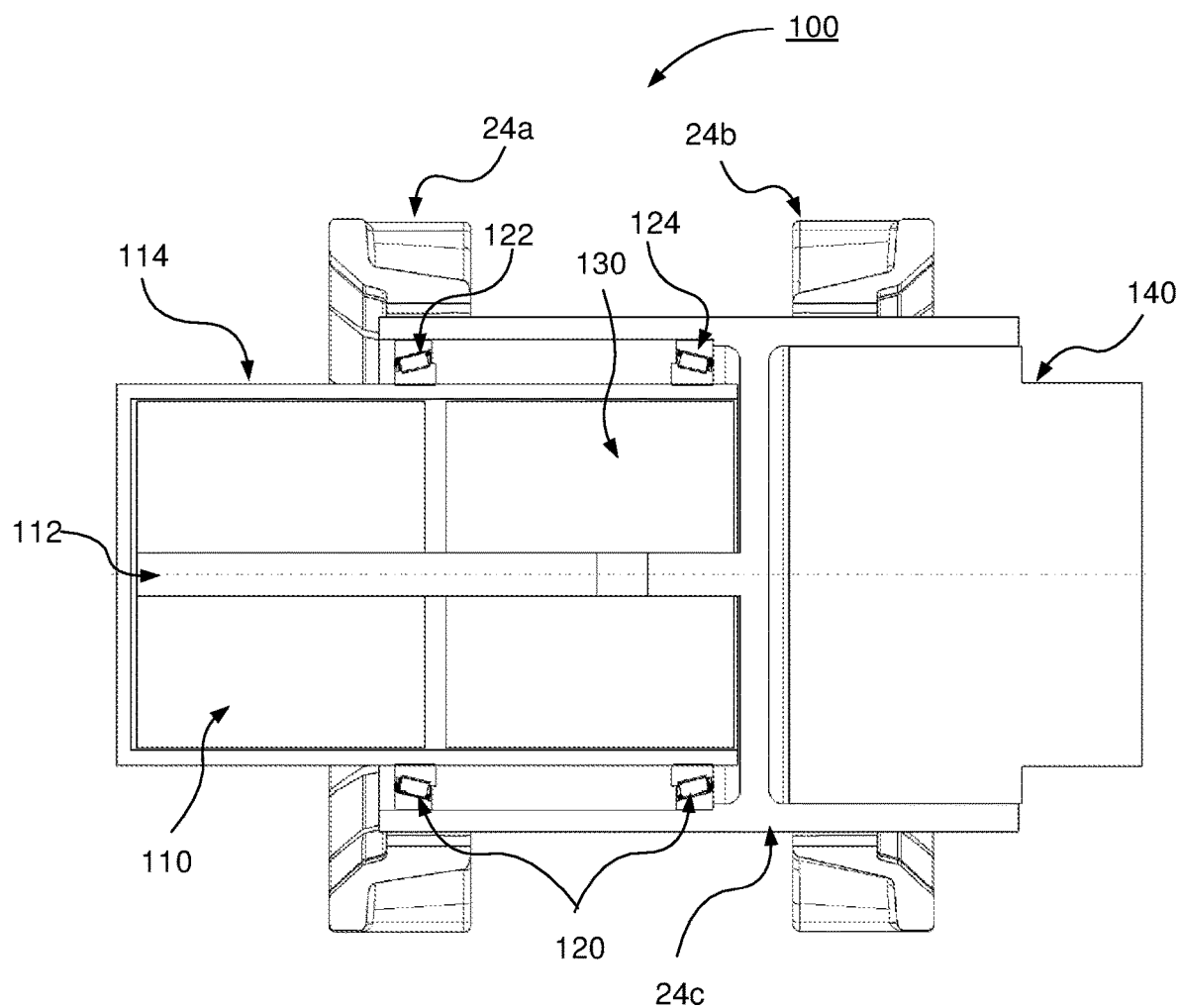
FIG. 6 schematically illustrates a cross sectional view of the drive arrangement in FIG. 5.

FIG. 5 schematically illustrates an exploded perspective view of the drive arrangement 100 according to an embodiment of the present invention and FIG. 6 schematically illustrates a cross sectional view of the drive arrangement 100 in FIG. 5.

The drive arrangement 100 comprises a motor 110 for operating said drive wheel 24. Said motor 110 may be an electric motor or a hydraulic motor. Said motor comprises a rotatable motor axle 112. Said motor 110 comprises a rotor 110a for providing a rotational movement of said motor axle 112. Said motor comprises a stator 110b configured to be fixedly attached to said track support beam 22. Said rotor is arranged to provide a rotational movement of said motor axle 112 relative to the stator for said operation of the drive wheel 24.

Said fastening arrangement 80, shown e.g. in FIGS. 3a and 3b, is according to an embodiment arranged to support said motor 110. Said stator 110b of the motor 110 is according to an embodiment configured to be fixedly arranged to said fastening arrangement 80. Said fork configuration 82 of said fastening arrangement 80, shown e.g. in FIGS. 3a and 3b, is according to an embodiment arranged to support said motor 110. Said stator 110b of the motor 110 is according to an embodiment configured to be fixedly arranged to said fork configuration 82 of said fastening arrangement 80.

Said drive arrangement 100 comprises according to this embodiment a motor housing 114 for housing said motor 110. Said stator 110b is configured to be fixedly arranged in said motor housing 114. Said stator 110b of the motor 110 is according to an embodiment configured to be fixedly arranged to said fork configuration 82 of said fastening arrangement 80 via said motor housing. Said motor housing 114 is according to an embodiment configured to be fixedly arranged to said fork configuration 82 of said fastening arrangement 80.

Said drive arrangement 100 comprises a bearing configuration 120. Said bearing configuration 120 is arranged to allow the drive wheel 24 to rotate relative to the stator 110b of the motor 110. The bearing configuration 120 is configured to be arranged about said motor housing 114. The bearing configuration 120 is according to this embodiment a rolling bearing configuration. The bearing configuration 120 comprises according to this embodiment a rolling bearing configuration with a first rolling bearing 122 and a second rolling bearing 124. Said first rolling bearing 122 and a second rolling bearing 124 are arranged around the periphery of said motor housing 114 at a distance from each other. Said first rolling bearing 122 and a second rolling bearing 124 are coaxially aligned and laterally separated from each other.

The drive arrangement 100 according to this embodiment further comprises a transmission device for transferring torque from said motor to said drive wheel 24. The transmission device 130 may be any suitable transmission device for transferring torque from said motor 110 to said drive wheel 24. The transmission device 130 comprises according to an embodiment a planetary gear and a transmission axle 132, 134 for said torque transfer. Said transmission axle 132, 134 comprises an input axle 132 configured to be coupled to said motor axle 112 and an output axle 134 configured to be coupled to said drive wheel 24 for torque transfer to said drive wheel 24.

The drive arrangement 100 according to this embodiment further comprises a brake member 140 for braking the drive wheel. The brake member 140 may be any suitable brake member such as one or more drum brakes or one or more disc brakes.

The drive wheel 24 has a centre axis Z.

The housing portion 24c of the drive wheel 24 has according to this embodiment a cylindrical configuration with openings O1, O2 at the respective ends and an internal space S. The housing 24c of said drive wheel 24 has a ring-shaped cross section.

The housing 24c of said drive wheel 24 is according to this embodiment arranged to receive said drive arrangement 100. Said drive arrangement 100 is arranged to at least partly be housed in said housing portion 24c of said drive wheel 24.

The housing 24c of said drive wheel 24 is according to this embodiment arranged to receive said motor 110. Said motor 110 is arranged to at least partly be housed in said housing portion 24c of said drive wheel 24.

The housing 24c of said drive wheel 24 is according to this embodiment arranged to receive said bearing configuration 120. Said bearing configuration 120 is arranged to at least partly be housed in said housing portion 24c of said drive wheel 24.

The housing 24c of said drive wheel 24 is according to this embodiment arranged to receive said transmission device 130. Said transmission device 130 is arranged to at least partly be housed in said housing portion 24c of said drive wheel 24.

The drive wheel 24 thus has an opening O1, O2 into an internal space S of said drive wheel 24 for receiving said motor 110. Said internal space of the drive wheel 24 has a transversal extension relative to the main direction of extension of the track assembly.

Said motor 110 is arranged in connection to the drive wheel 24 inside said internal space S of said drive wheel 24 or next to said drive wheel 24 so that the motor 110 at least partly is accommodated within the periphery of the drive wheel 24 in the direction transversal to a main direction of extension of the track assembly 21, see FIG. 3a, so as to allow said motor 110 to move relative to said vehicle body together with said track assembly 21. The motor 110 is according to an embodiment arranged to at least partly extend through said opening O1 of said internal space S of said drive wheel 24.

Said bearing configuration 120 is configured to be arranged between said motor housing 114 and said housing 24c of said drive wheel 24. Thus, said first rolling bearing 122 and a second rolling bearing 124 are arranged between said motor housing 114 and said housing 24c of said drive wheel 24. Said bearing configuration 120 is configured to be arranged between said motor housing 114 and said housing 24c of said drive wheel 24 so as to allow rotational movement of said housing 24c of said drive wheel 24 relative to said motor housing 114.

Thus, said bearing configuration 120 is configured to be arranged between said motor housing 114 and said housing 24c of said drive wheel 24 so as to allow rotational movement of said first gear portion 24a and a second gear portion 24b of said drive wheel 24 relative to said stator 110b of said motor 110.

Said motor axle 112 is operably connected to said housing 24c of said drive wheel 24 for rotating said drive wheel 24, see FIG. 6. Said motor axle 112 is configured to transfer torque to said housing 24c. Said motor axle 112 is operably connected to said housing 24c of said drive wheel 24 via said transmission device 130 for rotating said drive wheel 24, see FIG. 6. Said rotor 110a of the motor 110 is arranged to transfer torque to said housing 24c for rotating said housing 24c and hence said drive wheel 24. Said rotor 110a of the motor 110 is arranged to transfer torque to said housing 24c via said transmission device 130 for rotating said housing 24c and hence said drive wheel 24.

The stator 110b of said motor 110 is configured to be fixedly attached to said fastening arrangement 80, fastening arrangement 80 being shown in e.g. FIG. 3b and FIG. 4. The motor housing 114 is configured to be fixedly attached to said fastening arrangement 80. The brake member 140 comprises a stator part configured to be fixedly attached to said fastening arrangement 80 and a rotor part.

Said right clamping member 84a is arranged to clamp said motor housing 110 of said drive arrangement 100 to said right claw member 82a of said fork configuration 82 in connection to the right side of said drive wheel 24. Said left clamping member 84b is arranged to clamp the stator part of said brake member 140 of said drive arrangement 100 to said left claw member 82b of said fork configuration 82 in connection to the left side of said drive wheel 24.

Said brake member 140 may be any suitable brake member. Said brake member 140 is according to an embodiment a drum brake. Said brake member 140 is according to an embodiment a disc brake. Said brake member 140 is according to an embodiment a wet multi disc brake. Said brake member 140 is according to an embodiment a dry multi disc brake.

According to an embodiment said drive wheel 24 and said drive arrangement 100 constitute a drive unit of said track assembly. The drive unit constitutes a motorized drive wheel.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. A tracked vehicle comprising a vehicle body and a track assembly pair, said track assembly pair being arranged to suspendedly support said vehicle body allowing relative movement between said vehicle body and each track assembly of said track assembly pair, each track assembly comprising a track support beam configured to support a plurality of road wheels, a drive wheel, and a motor for operating said drive wheel, an endless track being disposed around said road wheels and drive wheel, said motor being fixedly arranged to said track support beam, wherein said motor is arranged in connection to the drive wheel such that a motor axle essentially coaxially coincides with a centre axis of the drive wheel, wherein said motor is comprised in a drive arrangement, said drive arrangement further comprising a transmission device for transferring torque from said motor to said drive wheel and a brake member for braking the drive wheel, wherein at least one of said transmission device and said brake member is arranged in connection to the drive wheel so that it at least partly is accommodated within a periphery of the drive wheel in a direction transversal to a main direction of extension of the track assembly, wherein each track assembly comprises a fastening arrangement arranged to support said drive arrangement, wherein said fastening arrangement comprises a claw configuration for supporting said drive wheel and drive arrangement, wherein non-rotating parts of said drive arrangement are arranged to be fixedly attached to said claw configuration, wherein said claw configuration comprises a right claw member and a left claw member for said attachment of said non-rotating parts, and a transversal portion from which said right claw member and left claw member are arranged to project.

2. The tracked vehicle according to claim 1, wherein said motor is arranged in connection to the drive wheel so that the motor at least partly is accommodated within the periphery of the drive wheel in the direction transversal to the main direction of extension of the track assembly so as to allow said motor to move relative to said vehicle body together with said track assembly.

3. The tracked vehicle according to claim 1, wherein the motor in a direction perpendicular to a longitudinal direction and the transversal direction of the endless track is arranged within a periphery of the endless track.

4. A tracked vehicle according to claim 1, wherein the motor is accommodated within said drive wheel within outer contours of the drive wheel.

5. The tracked vehicle according to claim 1, wherein said motor is an electric motor or a hydraulic motor, said motor comprising a stator and a rotor for providing a rotational movement of said motor axle relative to the stator for said operation of the drive wheel.

6. The tracked vehicle according to claim 5, wherein the stator of the motor is fixedly arranged relative to said track support beam via said fastening arrangement and the rotor of the motor is arranged to drive said drive wheel.

7. The tracked vehicle according to claim 5, comprising a bearing configuration, said drive wheel being journaled in bearings to said bearing configuration for allowing rotation of said drive wheel relative to said stator.

8. The tracked vehicle according to claim 7, wherein said bearing configuration is arranged in an internal space of a housing portion of said drive wheel.

9. The tracked vehicle according to claim 1, wherein said fastening arrangement comprises clamping members for clamping said drive arrangement to said claw configuration.

10. The tracked vehicle according to claim 9, wherein said clamping members comprises a right clamping member and a left clamping member, said right clamping member being arranged to clamp said drive arrangement to said right claw member of said claw configuration in connection to a right side of said drive wheel and said left clamping member is arranged to clamp said drive arrangement to said left claw member of said claw configuration in connection to a left side of said drive wheel.

11. The tracked vehicle according to claim 1, wherein said tracked vehicle is a forestry machine.

\* \* \* \* \*